UNITED STATES PATENT OFFICE.

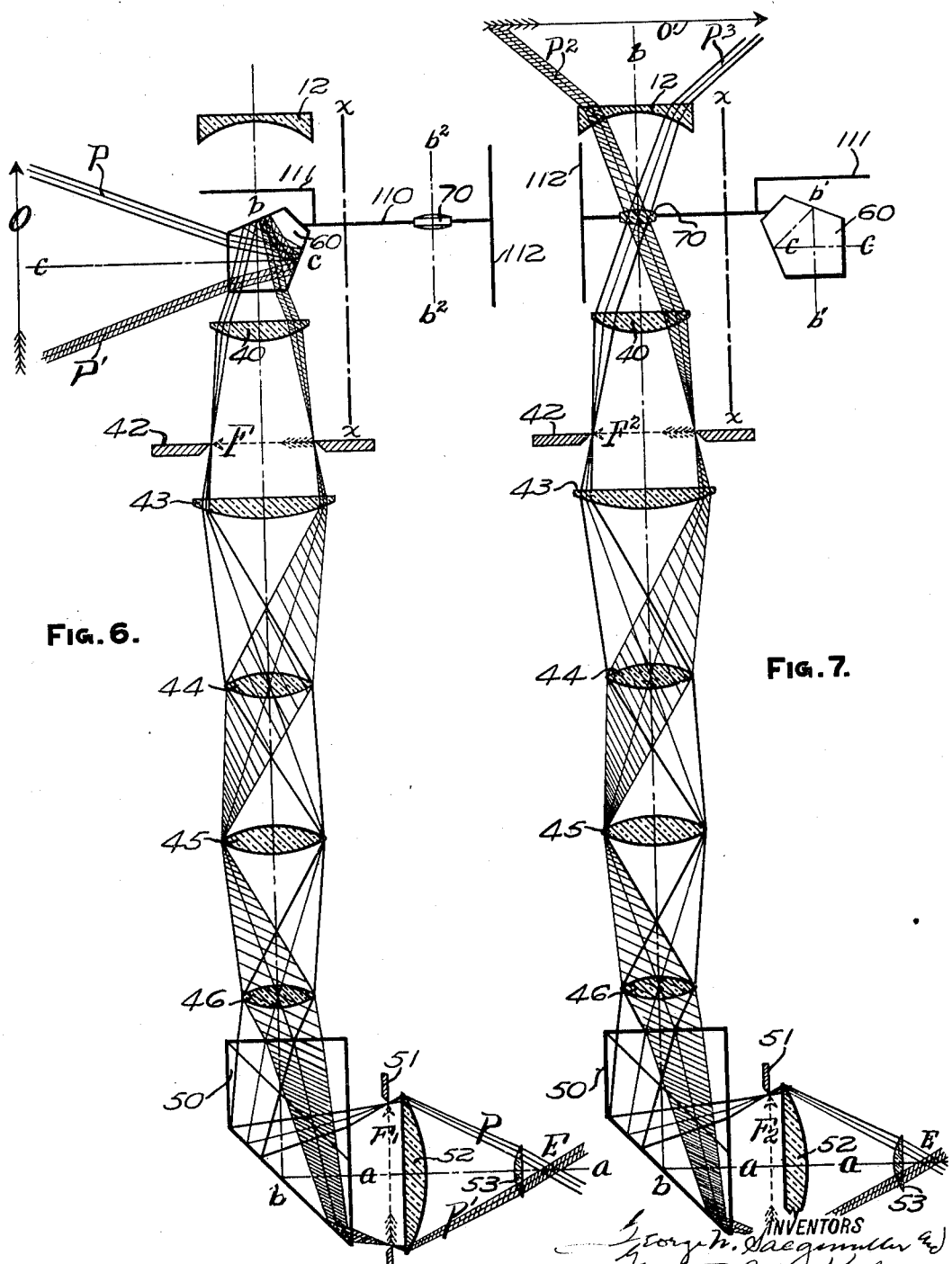

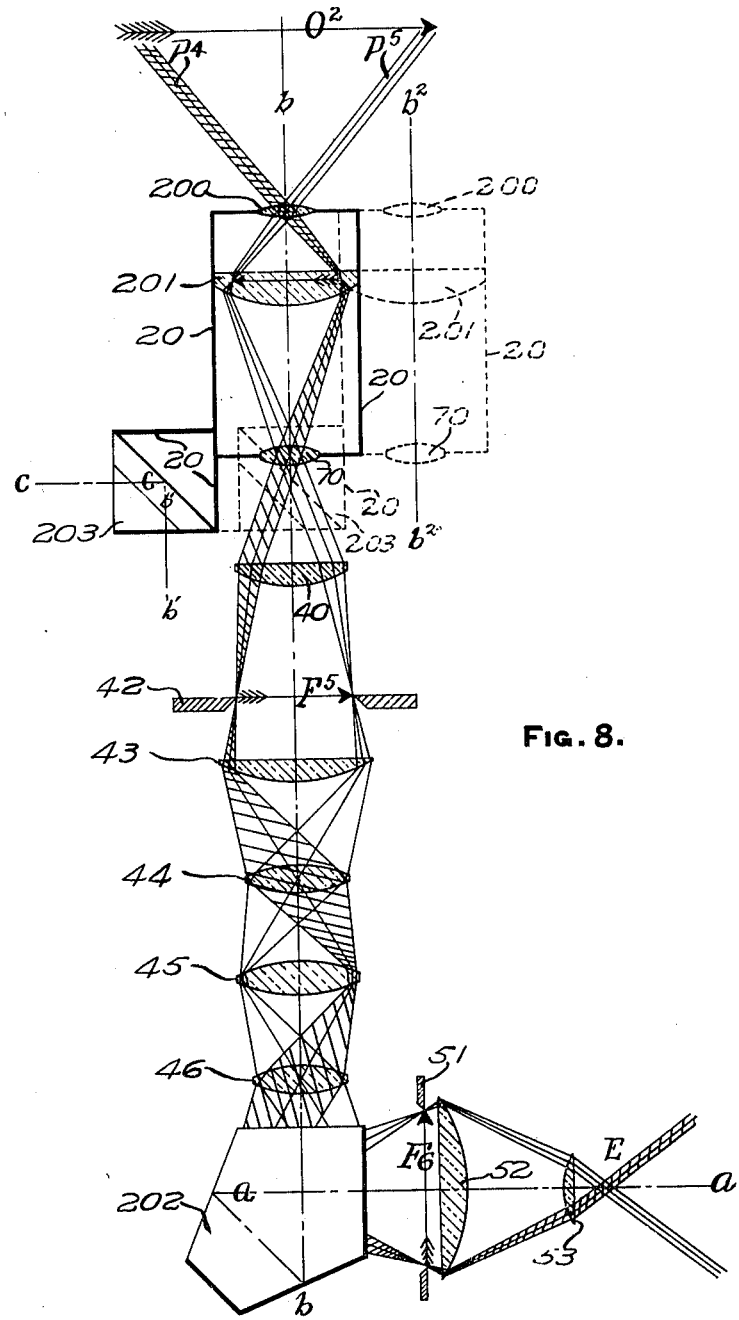

GEORGE N. SAEGMULLER AND GUSTAV A. H. KELLNER, OF ROCHESTER, NEW YORK, ASSIGNORS TO BAUSCH & LOMB OPTICAL COMPANY, OF ROCHESTER, NEW YORK, A CORPORATION OF NEW YORK.

PERISCOPE AND OPTICAL SYSTEM THEREFOR.

1,270,876.  Specification of Letters Patent.  Patented July 2, 1918.

Application filed December 6, 1915. Serial No. 65,809.

*To all whom it may concern:*

Be it known that we, GEORGE N. SAEGMULLER and GUSTAV A. H. KELLNER, citizens of the United States, and residents of Rochester, in the county of Monroe, State of New York, have invented certain new and useful Improvements in Periscopes and Optical Systems Therefor; and we do declare the following to be a full, clear, and exact description of the same, reference being had to the accompanying drawings, forming a part of this specification, and to the figures and letters of reference marked thereon.

Our invention relates to optical instruments that are adapted to receive light pencils from any one of a plurality of general directions and direct such pencils along a certain predetermined course. More particularly our invention relates to telescopes such as are known as periscopes.

Heretofore in the use of the periscope in submarine and in other places where the observer is confined and dependent upon the periscope for his outlook, his vision has been restricted to a zone extending in a substantially horizontal direction from the upper prism of the periscope, at a comparatively narrow angle, and any object overhead for a considerable distance has been entirely out of the observer's view. For this reason submarines are liable to be taken unawares by aeroplanes and thus become unduly exposed to attack from that quarter.

An object of our present invention is to enable an observer within a submarine to be able to see the entire horizon, including the sky above him, even though the submarine be submerged. Another object is to provide an optical instrument having the general form of a periscope, and adapted to viewing in either of two general directions, disposed at an angle to one another, the possible field of view of such an instrument comprising the sum of the angles of view in both directions, which may cover substantially a hemisphere. Another object resides in providing means whereby these ends are readily accomplished. Another object is to provide means that may be incorporated in dioptric or telescopic instruments whereby said instruments may be used to view objects in any one of a plurality of directions at will. Another object is to provide an optical instrument so organized that an observer may alternately or successively view objects lying in a plurality of directions. Still another object is to provide an instrument adapted to viewing objects in a plurality of directions without necessitating the moving of the instrument bodily. Other objects will hereinafter become apparent.

To these and other ends our invention consists in certain improvements and combinations of parts all of which will hereinafter be described, the novel features being pointed out in the claims at the end of the specification.

Fig. 6 shows an optical system for our improved instruments.

Fig. 7 shows the optical system shown in Fig. 6 with certain elements of the system in different positions.

Fig. 8 shows another optical system.

Like characters of reference throughout the several figures indicate the same parts.

Figure 1:
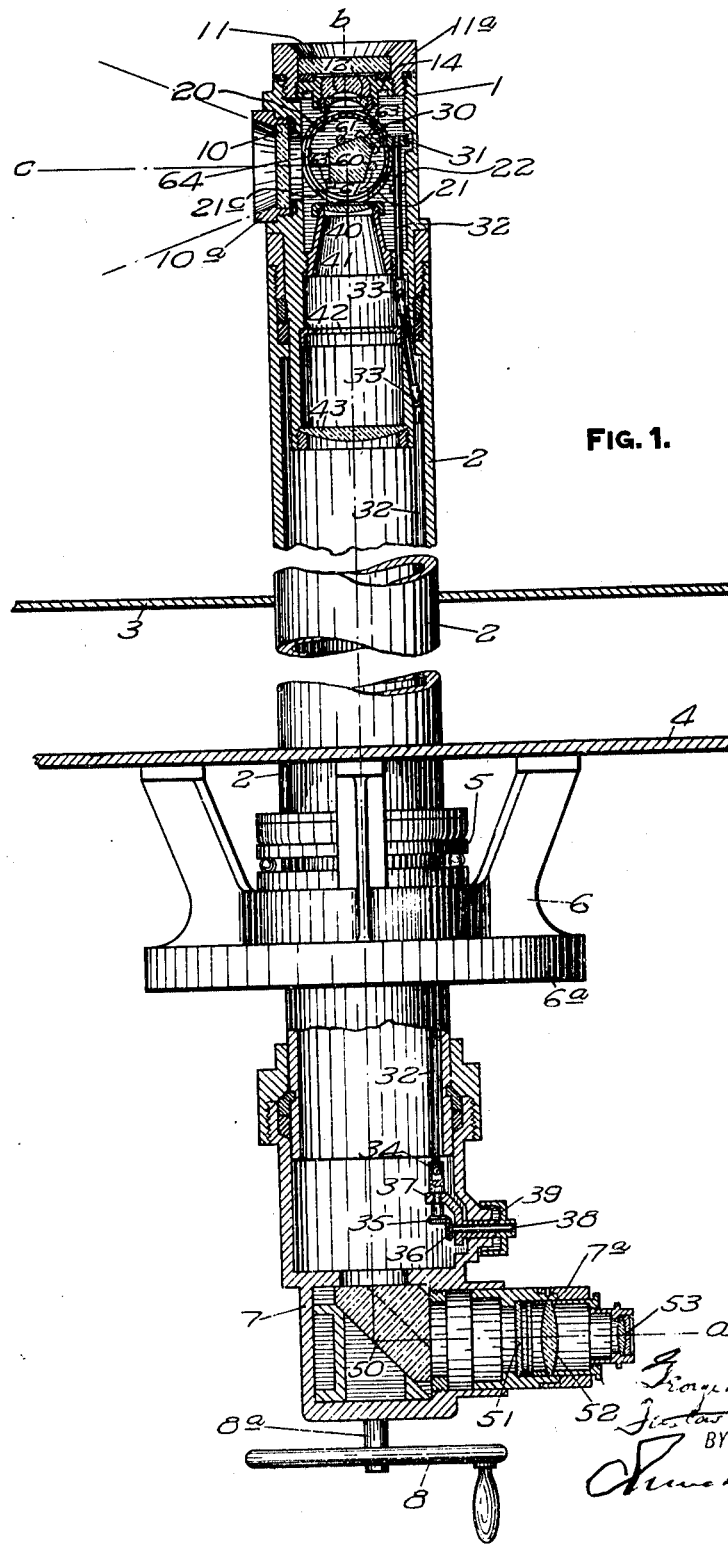
Figure 1 is an elevation of a periscope partly in section, embodying features of our invention, certain parts of the instrument being shown in position for lateral or horizontal sighting.

Referring now more particularly to the structure and apparatus illustrated: the numeral 1 indicates the periscope head as a unit. 2 indicates the periscope tube or casing which passes through portions of a submarine's structure as shown in Fig. 1, and indicated by 3 and 4. The periscope is supported usually in a vertical position by means of the thrust bearing 5 which rests on the bracket 6. 7 denotes the lower end or ocular unit of the periscope. A hand wheel 8 is provided, which, by means of its shaft 8ª and a pinion (not shown) coöperates with the internal gear portion 6ª of the bracket 6, and enables the operator to readily rotate the entire periscope about its longitudinal axis, whereby to view the entire horizon. This feature is common in periscopes of the "walk around" type.

The periscope head is provided with two windows, a vertically disposed or lateral window 10 and a horizontally disposed or overhead window 11. The lateral window 10 is mounted with its axis intersecting the axis of the periscope, in a cell 10$^a$ which is threaded into a suitable aperture in the side of the periscope head. The window 11 is mounted coaxial with the axis of the periscope, in a cell which forms a cap 11$^a$, threaded into the top of the head 1. Within the cap or cell 11$^a$ is mounted a negative lens combination 12, by means of a cell 14 which also serves to hold the window 11 in place. Within the head 1, and in the vicinity of the intersection of the axes of the windows 10 and 11, is mounted a slidable carriage 20, operating within a tubular sleeve or guideway 21, said carriage and sleeve being provided respectively, with a spline and splineway 22 adapted to constrain the carriage against rotative movement about its longitudinal axis. A rack 30 is secured along one side of the carriage 20 as shown, said rack being engaged by pinion 31, mounted at the upper end of shaft 32, which shaft is offset by means of universal joints 33, whereby to permit the use of as large aperture lenses as are needed in the intermediate portion of the periscope system.

The lower end of the shaft 32 is connected by means of a flexible coupling 34 which in this case, is an Oldham coupling, to the bevel gear 35 which meshes with bevel gear 36, both gears being journaled in the bracket 37. The end of the shaft 38 of the bevel gear 36 protrudes through the wall of the periscope and is provided with a knob 39 whereby the shaft 32 may be rotated in either direction and thereby effect the axial movement of the carriage 20 through the agency of the pinion 31 and the rack 30.

The objective 40 secured in the mount 41 is mounted preferably in close proximity to sleeve 21 and coaxial with the axis of the periscope, the diaphragm 42 is mounted in the focal plane of objective 40, and a collective lens 43 is mounted preferably as shown in the lower portion of the head 1.

In the ocular unit 7, in proximity to the ocular member proper 7$^a$ and at the intersection of the longitudinal axis of the periscope and the axis of the ocular, is mounted preferably a roof prism 50. Within the ocular member 7$^a$ and in the focal plane F' (see Fig. 1) is mounted a reticule 51, provided with cross hairs, and an ocular comprising a field or collecting lens 52, and an eye lens 53 is provided. The ocular is movable relatively to the reticule 51, whereby the instrument may be accommodated to eyes of different observers.

The lens system intermediate the collective lens 43 and the prism 50 is shown in Figs. 6 and 7 and will hereinafter be described.

The sleeve 21 wherein the carriage 20 slides, is provided with alined apertures 21$^a$ and 21$^b$, disposed in the axis of the periscope, and registering respectively with the negative lens combination 12 and the objective 40. The sleeve is also provided with an aperture 21$^c$ registering with window 10.

Figure 2:
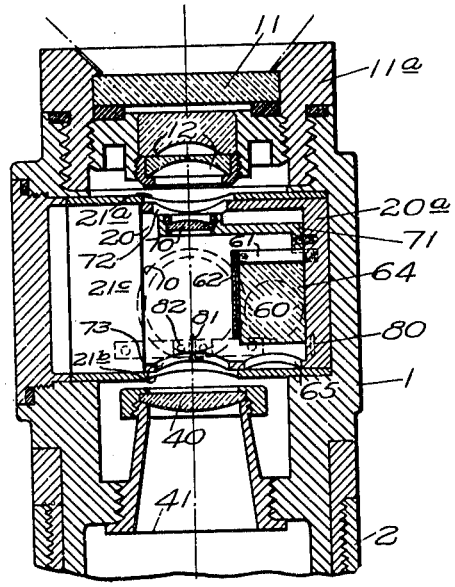
Fig. 2 is a vertical longitudinal section on an enlarged scale, of the head or upper portion of the instrument shown in Fig. 1, looking to the left of the instrument as shown therein; certain parts of the instrument in this figure being shown in position for longitudinal or aerial sighting.

The carriage 20 consists of a tubular portion open at one end and terminating at the other end in a wall or partition 20$^a$. Within the carriage 20 is mounted, a penta prism 60 which is secured to the wall 20$^a$ by means of studs 61 and a strap 62, see Figs. 1 and 2. Suitable cleats 63 are provided on the wall 20 to accurately locate and hold the prism 60 in place. The prism 60 is so positioned that when the carriage 20 is in the extreme left hand position of movement, viewing the instrument as shown in Fig. 2, the prism registers simultaneously with the window 10 and the objective 40, through suitable apertures 64 and 65 in the carriage 20 as shown in Fig. 1. Secured to the wall 20$^a$ of the carriage 20 shown in Fig. 2 is a bracket 71, in which is mounted a lens 70, disposed approximately as shown, whereby, when the carriage 20 is in the extreme right hand position as shown in Fig. 2, the axis of the lens 70 will be coincident with the axis of the negative lens combination 12 and the objective 40. Suitable apertures 72 and 73 are provided to register with the negative lens combination and the objective respectively. In order to keep the carriage 20 in the position to which the carriage has been moved by the rack and pinion movement, and to prevent the carriage sweeping back and forth in its sleeve 20 accidentally as might be caused by the rolling or pitching of the ship in which the instrument is mounted, are provided notches 80 and 81, and a spring pawl or detent 82 coöperating therewith.

Thus, with the mechanism thus far described, the observer placing his eye at 53 and adjusting the ocular thereto may, by manipulating the knob 39 to the right or to the left, be able to see laterally, through the window 10 when the elements of the instrument are in the position shown in Fig. 1, or view objects overhead or in the sky, through window 11, when the elements of the instrument are in the position shown in Fig. 2, extraneous light from the window not in use being screened off by the wall of the carriage which covers the aperture not in use in a manner similar to a three-way valve.

Figure 3:
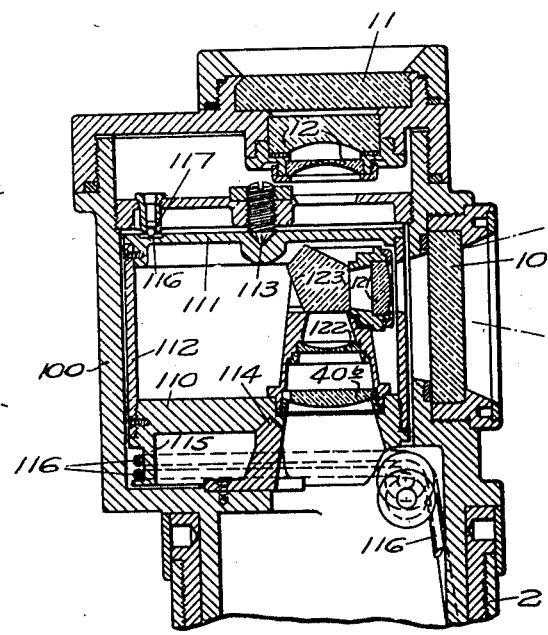
Fig. 3 is a vertical section on an enlarged scale of a form of head qualified to be embodied in a periscope to the exclusion of the form shown in Fig. 1.

In Fig. 3 is shown a form of head wherein the elements of the instrument that are to be changed and substituted are carried in a revolving turret or drum. This instrument incorporates in addition to the system described in the apparatus disclosed in Fig. 2 an additional system for lateral sighting. In this structure the numeral 100 indicates the head as a unit. Within the head is mounted a revolving turret or drum, which carries the elements of the structure and system to be substituted or changed. This turret is preferably made in three parts, the lower portion or base 110 forming a revolving table, and having means for rotating same, this means consisting either of the pulley 115 about which is coiled the cable 116, or of a gear adapted to mesh with the pinion shown in Fig. 1, or any other suitable means for rotating the drum 110. A cover plate 111 corresponding to the table 110 forms the other end of the drum, while a tubular shell 112 forms the periphery of of the drum 110. The drum 110 is journaled on the conically pointed studs 113—114 as shown and is provided with suitable notches coöperating with the pawl mechanism 117 whereby the registering positions of the elements such as the prism 60, the lens 70 and the high power lateral sighting system, which will hereinafter be described, may be readily brought to registry and held in that position without danger of accidental movement.

The optical members carried by the drum 110 comprise three systems, namely: the low power system for lateral sighting including the prism 60 and its individual objective 40ᵃ (which may be identical with objective 40); the high power system for lateral sighting including the prism 123, the lens combination consisting of members 121 and 122 and an individual objective 40ᵇ (which may be identical with objective 40ᵃ); and the overhead sighting system including the lens 70 and an individual objective 40ᶜ. These systems are mounted with their vertical axes equidistant from the axis of rotation of the drum 110 and are preferably spaced at equal intervals about this axis while the horizontal axes of the two lateral sighting systems extend radially outward.

Figure 4:
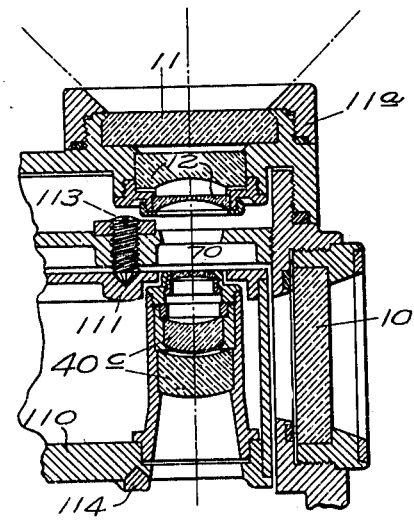
Figs. 4 and 5 are fragmentary portions of Fig. 3, showing certain elements of the structure in different positions.
Figure 5:
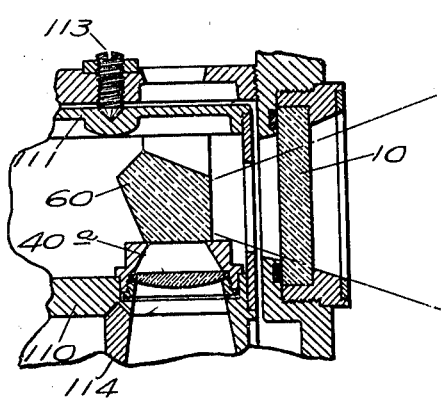

The head 100 containing the drum 110 is mounted at the upper or objective end of the periscope tube as shown in Fig. 3, the window 11 and the negative lens system 12 which are each held in independent mountings, being arranged co-axial with the lens system in the periscope tube, and the drum 110 being arranged with its axis of rotation eccentric to and parallel with the axis of the periscope tube lens system in order that by rotating the drum 110, the overhead sighting system, the low power lateral sighting system and the high power lateral sighting system may each be brought into coöperative relation with its respective window, 10 or 11 and the axis of the lens system in the periscope tube as shown in Figs. 4, 5 and 3 respectively.

Referring now to the optics of the instrument, the system shown in Fig. 6 and in Fig. 7 is the one which is shown incorporated in the instrument shown in Figs. 1 and 2, also in Figs. 3, 4, and 5, excepting that in Figs. 3, 4, and 5, three systems are provided which may be substituted for one another in the path of light of the instrument, two lateral and one overhead sighting system, and each system is shown as having its own individual objective. But since the optical functioning of the two lateral systems of sighting are believed to be not so dissimilar but that with an exposition of the low power system the high power system can readily be understood, the low power system only is included in the diagram, thus simplifying the diagrams and explanation thereof. For the same reason, the mechanical structure has been eliminated from these optical diagrams as far as possible, and likewise the revolving mount has been shown as the means whereby the substituting of the systems was to be effected; moreover, as great a portion of the system as possible is regarded as stationary.

Referring now more particularly to the optical diagrams, Fig. 6 and Fig. 7: Fig. 6 shows the elements of the system in position for lateral sighting and corresponds to the position which the elements of the instrument are shown to occupy in Figs. 1 and 5 and the optical functioning of the apparatus shown in Figs. 1 and 5 may be seen by reference to Fig. 6. Fig. 7 shows the elements of the system in position for overhead sighting, and corresponds to the position occupied by the apparatus shown in Figs. 2 and 4. The functioning of the apparatus shown in Fig. 3 it will be understood, is substantially the same as that of Fig. 5, well shown in Fig. 6, excepting that the lateral view angle will be smaller and the magnification greater.

P and P′ denote light pencils emanating from object O, which pencils are received by the upper or objective prism 60 which is preferably a penta prism as shown, and after being twice reflected, said pencils pass through objective 40 whereby they are brought to a focus at the focal plane F, at which plane is located diaphragm 42. Continuing on, pencils P and P′ pass through the reversing system, which comprises lenses 43, 44, 45, 46 and roof prism 50, whereby the rays of said pencils are again brought to a focus at the plane F′, at which plane is located reticule 51 (shown in the diagram as a diaphragm). An ocular comprising lenses 52 and 53 is provided as shown beyond plane F′, and functions to present pencils P and P' in the usual manner at the exit pupil E. It will be noted that roof prism 50 functions to direct the light pencils into the said ocular, therefore we may refer to said prism as an "ocular prism." With the members of the instrument in the position just described (see Fig. 6) any object in the general direction of axis $c$ $c$ and within the angular limits of the instrument such as indicated by the light pencils P and P' may be viewed.

This arrangement of the instrument adapts it to use in submarines for viewing vessels in the surrounding waters, it being feasible to rotate the instrument about axis $b$ $b$ as is usual in the case of periscopes of the "walk around" type.

For viewing objects in the general direction of axis $b$ $b$, we withdraw or remove prism 60 and utilize negative lens or lens combination 12 as shown in Fig. 7 wherein $P^2$ and $P^3$ denote light pencils emanating from object O' which pencils after passing through lens 12 are caused to converge at a lesser angle, preferable an angle of convergence corresponding to the angle of convergence of pencils P and P' before the latter enter prism 60. After crossing pencils $P^2$ and $P^3$ pass through objective 40, are brought to a focus at $F^2$, pass on through the reversing system, and are again brought to a focus at $F^3$, where they are picked up by an ocular system as explained in connection with Fig. 6.

In order that the two systems, namely the system for lateral sighting and the system for overhead sighting as shown in Figs. 6 and 7 respectively, may be par-focal, it is necessary that pencils $P^3$ and $P^2$ respectively, when received by objective 40, be incident thereon in the same manner that pencils P and P' are incident upon said objective. To this end, we place at the crossing point of the principal rays of the pencils $P^2$ and $P^3$, a positive lens 70, with its optical center coincident with said crossing point, the said lens being of such power that pencils $P^2$ and $P^3$, incident upon the plano surface of objective 40 are made to correspond in every essential particular with the pencils P and P' incident upon the same surface of said objective.

In the present embodiment it is preferred to render parallel the diverging secondary rays of pencils $P^2$ and $P^3$ before said pencils are incident upon objective 40. This is also preferably done without affecting the direction of the principal rays. Thus if the proper degree of convergence of the principal rays of said pencils is effected by member 12, and the divergence of the secondary rays of said pencils is compensated for by member 70, pencils $P^2$ and $P^3$ will obviously be incident upon objective 40 in substantially the same manner as pencils P and P' are incident upon the said objective. Thus, the pencils passing through objective 40, either form the arrangement of elements used in lateral sighting as indicated in Fig. 6, or from the arrangement of elements used in overhead sighting as indicated in Fig. 7, will be brought to a focus at common focal planes. Focal planes F and F', and focal planes $F^2$ and $F^3$ respectively, are common planes and coincident when the instrument is constructed to be par-focal.

The turret 110 it will be observed is diagrammatically shown in this figure, the axis $x$—$x$ being the axis of rotation thereof. Such portions of the cover 111 and the wall 112 as operate to exclude the extraneous light are also indicated.

Referring now particularly to the optical system shown in Fig. 8: $P^4$ and $P^5$ indicate light pencils emanating from object $O^2$, the principal rays of said pencils crossing at the optical center of the positive lens 200 whereby the rays of said pencils are brought to a focus at $F^4$ in the vicinity of the positive lens 201. Said lens 201 causes the principal rays of pencils $P^4$ and $P^5$ to converge and cross in substantially the same manner as pencils $P^2$ and $P^3$, the secondary rays of pencils $P^4$ and $P^5$ diverging as shown, which divergence is compensated for by the member 70 in substantially the same manner as explained in the description of the structure shown in Fig. 7. It will be seen that the pencils $P^4$ and $P^5$ are incident upon the objective 40 in substantially the same manner as pencils P, P' and $P^2$, $P^3$. The functioning of the system shown in Fig. 8 is substantially the same as that shown in Fig. 7 excepting that, inasmuch as, in the structure shown in Fig. 8, the pencils are crossed twice before reaching objective 40, one less reversion is necessary in the reversing system. Accordingly, in the structure indicated in Fig. 8, penta prism 202 may be used as an ocular prism and a roof prism 203 is preferably used as an objective prism. It will be noted that focal planes $P^5$ and $P^6$ respectively correspond to focal planes $F^2$ and $F^3$.

In the embodiment of our invention shown in Fig. 8, the members 200, 201 and 70 are indicated as being interchangeable with member 203 when it is desired to substitute vision in the general direction of axis $b$ $b$ for vision along a lateral axis $c$ $c$. The sliding carriage 20 is diagrammatically represented in this case (see Fig. 8) as the shiftable mount for the elements to be interchanged or substituted. The carriage 20 and the elements carried thereby are indicated in position for lateral sighting in dotted lines and in position for overhead sighting in full lines. The portions of the carriage which operate to exclude the extraneous light are also indicated in this figure.

Having thus described our invention what we claim and desire to secure by Letters Patent of the United States is:

1. In an optical instrument, the combination of a casing having an eye-piece end and an objective end provided with an opening disposed substantially horizontally for admitting light rays to the eye-piece end and also provided with an opening disposed substantially vertically, of an ocular and means adjustable into and out of optical coöperation with the vertical opening to deflect light rays entering therein toward the ocular and to cut off extraneous light rays entering the horizontal opening.

2. In an optical instrument, the combination with a tubular casing, an ocular and an objective head having an opening admitting light rays longitudinally of the casing and also provided with an opening admitting light rays in a direction laterally of the casing, said openings being arranged with intersecting axes, of means comprising a deflecting optical element and a mounting therefor, said optical element being movable into and out of said axes and adapted when located in operative relation to the last mentioned opening to deflect the light rays entering therein toward said ocular and also serving to intercept the light rays entering the first mentioned opening.

3. In an optical instrument, the combination with a tubular casing, an ocular and an objective head provided with an opening admitting light rays longitudinally of the casing and another opening admitting light rays in a direction laterally of the casing, of a plurality of optical elements capable of adjustment into and out of optical relationship with said openings and a mounting for said elements arranged to coöperate with said openings to close one of them when the other is opened.

4. In an optical instrument, the combination with a tube, an ocular, and an objective head on the tube having an opening in the end and an opening in the side thereof, of a mounting adjustably supported within the head, a lens system carried by the mounting coöperating with the end opening in the head and means supported on the mounting for deflecting light rays adapted to coöperate with the opening in the side of the head and the ocular.

5. In an optical instrument, the combination with a tubular casing, an ocular and an objective head having an opening in the end and an opening in the side thereof, of a mounting adjustable in the head having apertures coöperating with said openings, a lens mounted in one of said openings and light deflecting means positioned in the other opening.

6. In an optical instrument, the combination with a casing, an ocular and an objective head having an opening in the end and an opening in the side thereof, of an adjustable mounting in said head having a transverse aperture, permitting the passage of rays of light in a longitudinal direction through the head of the instrument, and provided with an aperture adapted to register with the opening in the side of said head, a lens located in the first mentioned aperture and a deflector positioned in the second mentioned aperture and means for adjusting said mounting from the exterior of the casing.

7. In an optical instrument, the combination with a system of optical elements comprising an ocular and an objective, a casing therefor having an open end and provided at one side with an aperture admitting light rays at an angle to the axis of the lens system in the vicinity of the objective, a deflector arranged to receive light rays entering said aperture to deflect them in the direction of the ocular, a mounting adjustably supporting said deflector whereby it may be moved into and out of operative position, said mounting being arranged to intercept light rays entering the end of the casing when the deflector is in operative position and to cut off light rays entering the aperture in the side of the casing when the deflector is moved into inoperative position.

8. In an optical instrument, the combination with a casing having an objective head having an opening in the axis of the casing and provided with a second opening admitting light rays at an angle to said axis, of a mounting within the head carrying a lens and a light deflecting means, said mounting being adjustable to alternately position the lens and deflector in operative relationship to the respective opening in said head.

9. In an optical instrument, the combination with a casing having an objective head having an opening in the axis of the casing and provided with a second opening admitting light rays at an angle to said axis, of a telescope system arranged co-axially within the casing with its objective disposed in proximity to both openings, an objective prism adapted to be disposed between the objective and the said openings, said prism being mounted to be movable into and out of the axis of the objective and means for moving the prism.

10. In an optical instrument, the combination with a casing having an objective head having an opening in the axis of the casing and provided with a second opening admitting light rays at an angle to said axis, of a telescope system arranged co-axially within the casing with its objective disposed in proximity to both openings, one or more negative lenses, mounted co-axial with and in proximity to the first named opening, a positive lens and an objective prism mounted to be alternately interposed in the axis of the objective and coöperating respectively with the first named opening and the objective and with the last named opening and the objective, a movable mounting for the positive lens and objective prism, and means for operatively moving the mounting.

11. In a periscope, the combination of a periscope tube and an ocular, an objective head having an opening admitting light rays longitudinally of the tube and a second opening admitting light rays laterally thereof, a plurality of optical systems adapted to coöperate with said openings and the ocular, an adjustable mounting for the optical systems, and means for moving the mounting including a shaft extending along the inside of the periscope tube, having an operating portion adjacent the ocular.

12. In a periscope, the combination of a periscope tube and an ocular, an objective head having an opening admitting light rays longitudinally of the tube and a second opening admitting light rays laterally thereof, a plurality of optical systems adapted to coöperate with the said openings and the periscope tube, a tubular adjustable mounting movable in the direction of its longitudinal axis, a sleeve in which the mounting is slidably held, an aperture in the sleeve registering with each of said light admitting openings and an aperture registering with the periscope tube, a plurality of pairing apertures in the mounting adapted to coöperate selectively with the apertures in the sleeve whereby the mounting may open a selected light path while excluding light from all other sources, one of the optical systems being mounted in registry with each pair of apertures in the mounting, means for shifting the mounting, and means for securing the mounting against accidental movement.

13. In a periscope, the combination of a periscope tube and an ocular, an objective head having a light admitting opening substantially coaxial with the longitudinal axis of the tube and a lateral light admitting opening arranged with its axis angularly disposed with relation to the said axis of the tube, a mounting rotatable about an axis substantially parallel to the axis of said tube, a plurality of optical systems each individual to one or the other of said light admitting openings and adapted to be carried wholly or in part by said mounting, means for moving said mounting rotatably about its axis whereby each of said optical systems may be selectively brought into operative relation with the periscope tube and that light admitting opening with which the individual system is designed to coöperate.

14. An optical system for periscopes having a pair of light admitting apertures, said system comprising, a telescope system adapted to be wholly or in part common to both apertures and coaxial with one of them, an optical prism individual to one of the apertures, one or more lenses individual to the other aperture, said prism and lenses adjustably coöperating with their respective apertures and the telescope system, and means for excluding extraneous light from one aperture when light rays are admitted through the other.

15. An optical system for periscopes having a pair of light admitting apertures, said system comprising, a telescope system adapted to be wholly or in part common to both apertures and coaxial with one of them, an optical prism individual to one aperture, a lens system including one or more negative lenses individual to the other aperture, said prism and lens system adjustably coöperating with their respective apertures and the telescope system, and means for excluding light from one aperture when light rays are admitted through the other.

16. An optical system for a periscope having a pair of light admitting apertures, said system comprising, a telescope system adapted to be wholly or in part common to both apertures and coaxial with one of them, an optical prism individual to one aperture, a system of positive lenses individual to the other aperture, said prism and lens system adjustably coöperating with their respective apertures and the telescope system, and means for excluding light from one aperture when light rays are admitted through the other.

17. An optical system for a periscope having an aperture for admitting lateral light rays and an aperture for admitting longitudinal light rays, said system comprising, a telescope system adapted to be wholly or in part common to both apertures and coaxial with the latter, a prism adapted to deflect the lateral light rays along the axis of the telescope system, a lens system adapted to refract the longitudinal light rays to amplify the angle of view of the telescope system in a longitudinal direction, said prism and lens system each being adapted to coöperate with the telescope system to the exclusion of the other.

18. An optical system for periscopes having a pair of light admitting apertures, said system comprising, a telescope system adapted to be wholly or in part common to both apertures, a supplementary optical system individual to each of said apertures, each of said supplementary optical systems being adapted, in turn, to selectively coöperate with their respective apertures and the telescope system, and means for rendering the arrangement of the telescope system with each of the supplementary systems parfocal.

19. An optical system for a periscope having a pair of light admitting apertures, said optical system comprising, a telescope system adapted to be wholly or in part common to both apertures, one or more interchangeable supplementary optical systems individual to each of the said light admitting apertures, said supplementary optical systems each being adapted to coöperate with its respective light admitting aperture and the telescope system, a positive lens arranged between one or more of the supplementary optical systems and the telescope system and functioning at the crossing point of the principal rays of light adapted to pass from said supplementary optical systems to the telescope system whereby to render each arrangement of the telescope with the various supplementary optical systems par-focal, and means for excluding extraneous light.

20. In an optical instrument. the combination with an objective, of a view angle modifying lens adapted to coöperate with the objective in spaced relation thereto, the distance between the objective and the lens being such that the pencils of light passing from said lens to the objective will cross at a point therebetween, and a lens positioned at the crossing point of said light pencils and adapted to deflect the secondary rays of said pencils without deflecting the principal rays thereof.

21. In a sighting apparatus, the combination of a lens tube, and an image-forming optical system comprising a side lens, a sky lens, the axes of said lenses intersecting, and an objective reflecting surface having one position at said intersection, and another position out of line with the axis of said sky lens.

GEORGE N. SAEGMULLER.
GUSTAV A. H. KELLNER.

Witnesses:
WILLIAM G. WOODWORTH,
GEORGE A. PAGE.